United States Patent
Sergeev et al.

(10) Patent No.: US 12,537,717 B2
(45) Date of Patent: Jan. 27, 2026

(54) TIME-SENSITIVE TRANSMISSION OF ETHERNET TRAFFIC BETWEEN ENDPOINT NETWORK NODES

(71) Applicant: ADTRAN Networks SE, Meiningen (DE)

(72) Inventors: Andrew Sergeev, Kfar Saba (IL); Robert Dittmar, Garland, TX (US); Silviu Adrian Sasu, Munich (DE); Edna Ganon, Nesher (IL)

(73) Assignee: ADTRAN Networks SE, Meiningen (DE)

( * ) Notice: Subject to any disclaimer, the term of this patent is extended or adjusted under 35 U.S.C. 154(b) by 682 days.

(21) Appl. No.: 17/842,140

(22) Filed: Jun. 16, 2022

(65) Prior Publication Data

US 2022/0407742 A1    Dec. 22, 2022

(51) Int. Cl.
| | |
|---|---|
| H04L 12/46 | (2006.01) |
| H04L 47/28 | (2022.01) |
| H04L 47/43 | (2022.01) |
| H04W 76/12 | (2018.01) |

(52) U.S. Cl.
CPC ......... *H04L 12/4641* (2013.01); *H04L 47/28* (2013.01); *H04L 47/43* (2022.05); *H04W 76/12* (2018.02)

(58) Field of Classification Search
None
See application file for complete search history.

(56) References Cited

U.S. PATENT DOCUMENTS

| | | | |
|---|---|---|---|
| 8,462,817 B2 | 6/2013 | Ketchum et al. | |
| 11,063,884 B2 * | 7/2021 | Ganga | H04L 49/552 |
| 11,234,163 B1 * | 1/2022 | Ho | H04W 28/06 |

(Continued)

FOREIGN PATENT DOCUMENTS

WO    2016110327 A1    7/2016

OTHER PUBLICATIONS

European Search Report, EP 21179897, Documents to Be Considered Relevant, date of search Oct. 27, 2021; 1 page.

*Primary Examiner* — Khaled M Kassim
*Assistant Examiner* — Shima Wasel
(74) *Attorney, Agent, or Firm* — Whitestone Law, PLLC

(57) ABSTRACT

There is provided a technique of time-sensitive transmission of Ethernet traffic in IET-blind network. A source endpoint network node receives expedited and non-expedited Ethernet frames; for each non-expedited Ethernet frame: detects a pre-provisioned designated non-expedited tunnel with a destination endpoint network node corresponding to a destination address specified in the Ethernet frame, segments non-expedited Ethernet frame into a plurality of segments, encapsulates each segment in accordance with the designated non-expedited tunnel; and sends the encapsulated segments to the destination endpoint network node via the designated non-expedited tunnel. When the designated non-expedited tunnel is constituted by a plurality of successive sub-tunnels (e.g. corresponding to a PDU-session of 5G), the technique further comprises initial encapsulating each segment in accordance with a first of successive sub-tunnels and, when swapping to a next sub-tunnel, relaying the encapsulation of each segment according to a network protocol characterizing the next sub-tunnel.

18 Claims, 11 Drawing Sheets

(56) References Cited

U.S. PATENT DOCUMENTS

| | | | |
|---|---|---|---|
| 2011/0261814 A1* | 10/2011 | Matthews | H04L 47/28 |
| | | | 370/389 |
| 2017/0105142 A1* | 4/2017 | Hecht | H04B 7/185 |
| 2017/0244648 A1* | 8/2017 | Tse | H04L 47/36 |
| 2017/0331748 A1 | 11/2017 | Mangin | |
| 2018/0041432 A1 | 2/2018 | Göetz et al. | |
| 2018/0159739 A1* | 6/2018 | D'Ercoli | H04L 41/0816 |
| 2020/0280457 A1 | 9/2020 | Inoue et al. | |
| 2020/0322052 A1* | 10/2020 | Yigit | G06F 9/547 |
| 2021/0036885 A1 | 2/2021 | Hisano et al. | |
| 2021/0083982 A1 | 3/2021 | Hisano et al. | |
| 2021/0288910 A1* | 9/2021 | Daly | H04L 47/24 |
| 2022/0061129 A1* | 2/2022 | Pani | H04L 12/66 |
| 2022/0263743 A1* | 8/2022 | Gebert | H04W 76/15 |
| 2022/0330129 A1* | 10/2022 | Yao | H04W 40/24 |
| 2023/0239174 A1* | 7/2023 | Miklós | H04W 28/0263 |
| | | | 370/254 |

* cited by examiner

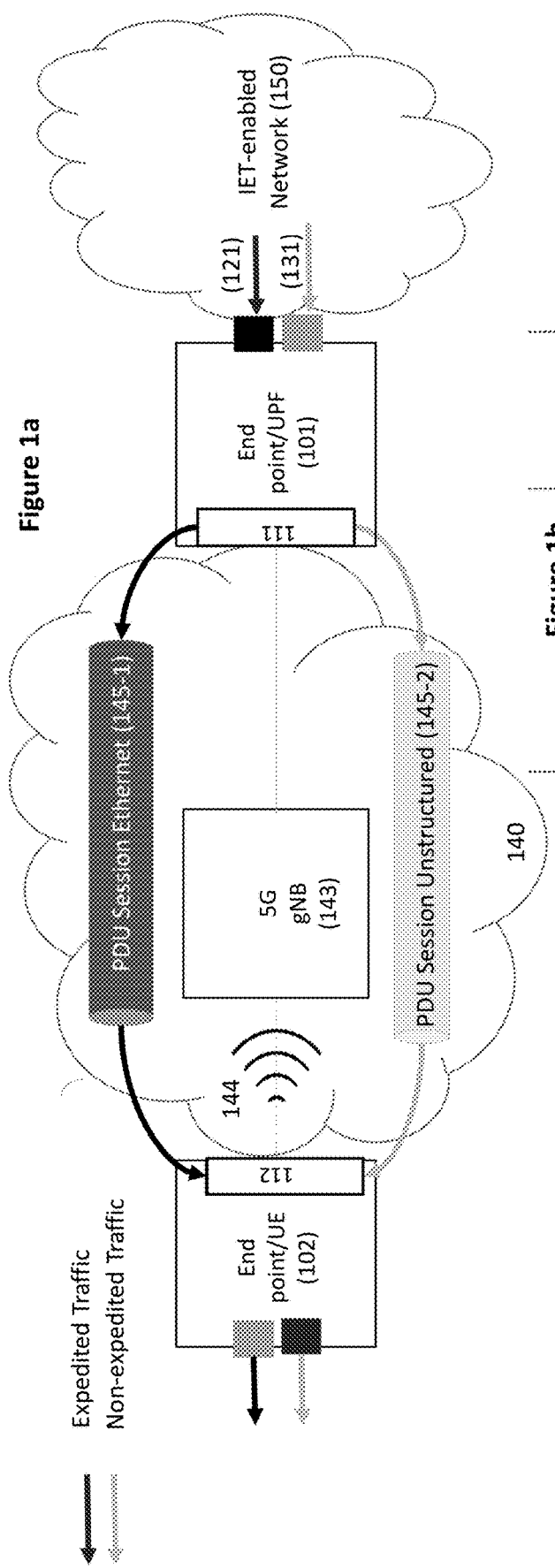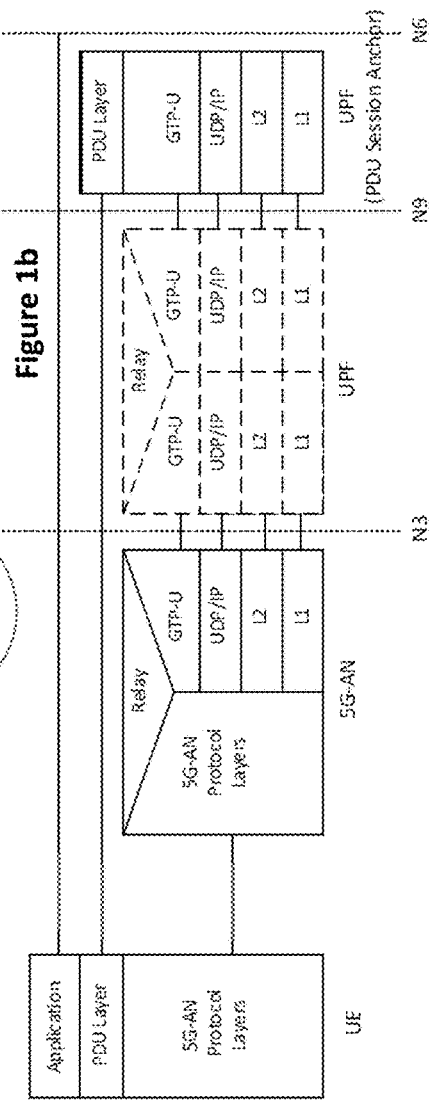

TIME-SENSITIVE TRANSMISSION OF ETHERNET TRAFFIC BETWEEN ENDPOINT NETWORK NODES

CROSS-REFERENCE TO RELATED APPLICATION

The present application claims benefit from European Patent Application No. 21179897.0 filed on Jun. 16, 2021 and which is herein incorporated by reference in its entirety.

TECHNICAL FIELD

The presently disclosed subject matter relates to Ethernet communication between network nodes and, more particularly, to time sensitive communication therebetween.

BACKGROUND

Nowadays Ethernet is a predominantly applied technology for the transport layer of communication networks. However, the conventional Ethernet is not designed to satisfy the needs of time-sensitive applications that require strict control of latency and jitter. Thus, there is a need in the art to provide Ethernet-based communication with additional features and mechanisms that address time synchronization, latency and reliability. Such features can enable applications with time-sensitive, fail-safe requirements to use the same infrastructure as other Ethernet-based services.

As known, a transmission of a given Ethernet frame can block the transmission of other Ethernet frames until the end of the given frame is reached. Accordingly, transmission of a high-priority frame can be delayed due to transmission a low priority frame.

IEEE802.1Qbu and IEEE802.3br standards propose to overcome this drawback by implementing frame preemption (FPE) technique. With preemptive forwarding, the transmission of a lower priority Ethernet frame can be interrupted so that the higher priority Ethernet frame can be expedited. High-priority frames can interrupt transmission of preemptable frames with lower priority. Thus, the frames corresponding to a higher priority time-sensitive application experiences very little delay at the expense of other applications, which are not time-sensitive.

In accordance with these standards, frame preemption defines two MAC services for an egress port, frames with preemptable MAC (pMAC) and express frames with express MAC (eMAC). Express frames can interrupt transmission of preemptable frames. However, the express traffic (referred to in the standards as Interspersed Express Traffic or IET) can be kept as expedited only when transferred between IET-enabled hops.

Problems of implementing the frame preemption (FPE) have been recognized in the conventional art and various techniques have been developed to provide solutions, for example:

US Patent Application No. US2021/0036885 discloses a transfer device for coupling a priority signal and a standard signal and transferring the signal. The device includes a reception unit that receives a plurality of signals transmitted from a device connected to an opposite side of a transfer route, a separation unit that separates the signal into the priority signal and the standard signal, a signal defragmentation unit that defragments the plurality of standard signals, a multiplexing unit that multiplexes each of the priority signal and the standard signal, a priority control unit that determines a transfer order of the signals, a header information copy unit that copy header information of the standard signal, a transmission unit that transmits the signal to a device connected to the transfer route, an interrupt transfer processing unit that perform an interruption process when the priority signal arrives during the transfer of the standard signal, a signal fragmentation unit that fragments the standard signal, a header information assignment unit that assigns the header information to the standard signal, and a transmission delaying unit that delays the transfer of the standard signal until the priority signal has been transferred.

US Patent Application No. US2018/0041432 discloses a method for data transmission in a communications network, data frames containing metadata and payloads are transmitted via point-to-point connections between a respective transmitter and a receiver according to a communications protocol. For each point-to-point connection, a transmission list of the data frames to be transmitted from the transmitter to the receiver is kept. In addition, a priority set of at least three interrupt priorities of pairs with differing significance is provided, and the communications protocol permits each data frame of a transmission list to be assigned an interrupt priority and to interrupt a current transmission of a data frame of the transmission list in order to transfer a data frame that is contained in the transmission list and that has been assigned a higher interrupt priority than the currently transferred data frame.

US Patent Application No. US2017/0331748 discloses a method for traffic shaping of data frames to transmit in a telecommunication network, the frames to transmit being distinguished between: express frames, needing to be sent within predetermined time windows, and normal frames, intended to be sent at times outside said time windows. More particularly, for a current normal frame, the method comprises the steps of: determining whether said normal frame can be fragmented, and if yes: determining whether a remaining time to a next time window opening is enough to transmit one or several fragments of said normal frame, and if yes: transmitting said one or several fragments.

International Patent Application No. WO16/110327 discloses method and apparatus for transmitting data in a data network on the basis of the Ethernet standards, using at least one first data transmission mode and at least one second data transmission mode, which is different from the first data transmission mode. The first data transmission mode is set up and suitable for transmitting higher-priority data packets for real-time communication, and the second data transmission mode is set up and suitable for transmitting lower-priority data packets for which no real-time communication is required. In this case, a low-priority data packet is fragmented into a suitable number M of data fragments, where M greater than or equal to 1 and the first M–1 data fragments are not below a fragment size N, and when a higher-priority data packet is available for transmission, the transmission of a low-priority data packet is immediately interrupted, and after the higher-priority data packet has been transmitted, the transmission of the interrupted low-priority data packet is continued at the point of interruption.

The references cited above teach background information that may be applicable to the presently disclosed subject matter. Therefore, the full contents of these publications are incorporated by reference herein where appropriate for appropriate teachings of additional or alternative details, features and/or technical background.

General Description

The inventors have recognized and appreciated that the frame—preemption approach can have significant implementation problems in communication in and/or through IET-blind networks (i.e. network comprising at least one NW node without standard-defined frame preemption capabilities and, thus, preventing transmission of the expess frames as Interspersed Express Traffic (IET) defined by IEEE802.1Qbu and IEEE802.3br standards).

In accordance with certain aspects of the presently disclosed subject matter, there is provided a method of time-sensitive transmission of Ethernet traffic comprising expedited and non-expedited Ethernet traffic to be transmitted between network nodes operatively connected via an IET-blind communication network. The method comprises: pre-provisioning the communication network to create a first plurality of pre-provisioned tunnels designated to non-expedited Ethernet traffic and a second plurality of pre-provisioned tunnels designated to expedited Ethernet traffic, each tunnel specified, at least, by source and destination endpoint network nodes and by a respective network protocol. At a source endpoint network node: receiving expedited and non-expedited Ethernet frames; for each non-expedited Ethernet frame: detecting, among the first plurality of pre-provisioned tunnels, a tunnel starting at the source endpoint network node and with a destination endpoint network node corresponding to a destination address specified in a given non-expedited Ethernet frame, thereby giving rise to a designated non-expedited tunnel; providing segmentation of the given non-expedited Ethernet frame to yield a plurality of segments constituting the given frame; encapsulating each segment from the plurality of segments in accordance with the designated non-expedited tunnel, thereby giving rise to a plurality of encapsulated segments, wherein each given encapsulated segment comprises a metadata structure added, at the source endpoint network node, to a payload of the given segment and usable for further reassembling the frame at the destination endpoint network node, and wherein the metadata structure is informative, at least, of sequence numbers of the frame and the given segment and a type of segment indicative of a relative location of the given segment within a sequence of segments from the plurality of segments; and sending each encapsulated segment from the plurality of encapsulated segments to the destination endpoint network node via the designated non-expedited tunnel.

The method can further comprise at the source endpoint network node: for each expedited Ethernet frame detecting, among the second plurality of pre-provisioned tunnels, a tunnel starting at the source endpoint network node and with destination endpoint network node corresponding to a destination address specified in a given expedited Ethernet frame, thereby giving rise to a designated expedited tunnel; encapsulating each expedited Ethernet frame in accordance with the designated expedited tunnel; and sending each encapsulated expedited Ethernet frame to the destination endpoint network node via the designated expedited tunnel.

Alternatively, the method can further comprise at the source endpoint network node: associating the expedited frames with QoS marks indicative of a strict highest priority and transmitting the expedited frames via the designated non-expedited tunnel shared with the segments of non-expedited frames or without tunnel encapsulation.

The method further comprises at the endpoint destination node: receiving the plurality of encapsulated segments of the given non-expedited Ethernet frame, decapsulating each encapsulated segment and using the added metadata structure to reassemble the given non-expedited Ethernet frames.

Reassembling the given non-expedited Ethernet frame can comprise: a. reading metadata structure added to a given segment and matching the obtained type of the given segment along with the frame and segment numbers to a current reassembly context; b. removing the added metadata structure from a payload of the given segment, appending the payload of the given segment to a reassembling payload in accordance with the reassembly context and modifying the reassembly context accordingly; and c. repeating operations a) and b) for each next segment upon receiving all expected segments of the given frame thereby completing reassembling of the given non-expedited Ethernet frame.

In accordance with further aspects and, optionally, in combination with other aspects of the presently disclosed subject matter, each encapsulated segment can further comprise data informative of the non-expedited designated tunnel, said data prepended to the payload or inserted into the payload of the encapsulated segment and is removed during re-assembling.

In accordance with further aspects and, optionally, in combination with other aspects of the presently disclosed subject matter, the designated non-expedited tunnel can be constituted by a plurality of successive sub-tunnels. The method can further comprise initial encapsulating each segment in accordance with a first of successive sub-tunnels and, when swapping to a next tunnel in the plurality of successive sub-tunnels, accordingly relaying the encapsulation of each segment.

In accordance with further aspects and, optionally, in combination with other aspects of the presently disclosed subject matter, transmitting the Ethernet traffic between the source and the destination endpoint network nodes can comprise transmitting over a 5G mobile network, and the plurality of successive sub-tunnels can comprise a plurality of sub-tunnels corresponding to a PDU-session usable for transmitting the encapsulated segments over the 5G network.

Transmitting Ethernet traffic between the source and the destination endpoint network nodes can further comprise transmitting the Ethernet traffic over a data network prior to transmitting it over the 5G mobile network interconnected with the data network with the help of an UPF (User Plane Function) network node, and the designated non-expedited tunnel can comprises a VLAN tunnel between the source network node and the UPF network node, the VLAN tunnel to be relayed at the UPF network node to the plurality of tunnels corresponding to the PDU-session.

In accordance with further aspects and, optionally, in combination with other aspects of the presently disclosed subject matter, the designated non-expedited tunnel can comprise a VLAN tunnel starting at the source network node, the method can further comprise enabling transmission of each non-initial encapsulated segment as a pseudo Ethernet frame, wherein the enabling comprises: using data at +0 to +5 offset of a payload of a given segment as pseudo-DMAC (destination MAC) address and data at +6 to +11 offset as a pseudo-SMAC (source MAC) address; and inserting at +12 offset of the payload of the given segment VLAN tag of the VLAN tunnel.

Further, the method can comprise assuring validity of the pseudo-DMAC address by inserting therein an indication of a locally administrated address, and assuring validity of pseudo-SMAC address by inserting therein an indication of unicast transmission, wherein the indications are inserted by replacing original payload bits at the locations designated to said indications, wherein the original payload bits are stored in the added metadata structure and usable for reassembling the given non-expedited Ethernet frame.

In accordance with other aspects of the presently disclosed subject matter, there is provided a network node configured as a source node for time-sensitive transmission of Ethernet traffic to a destination network node operatively connected via an IET-blind communication network, the network node configured to perform the method above.

In accordance with other aspects of the presently disclosed subject matter, there is provided a network node configured as a destination node for time-sensitive transmission of Ethernet traffic from a source network node operatively connected via an IET-blind communication network, the network node configured to perform the method above.

Among advantages of certain embodiments of the presently disclosed subject matter is capability of time-sensitive and latency-bound transmission of Ethernet traffic via an IET-blind network.

BRIEF DESCRIPTION OF THE DRAWINGS

In order to understand the invention and to see how it can be carried out in practice, embodiments will be described, by way of non-limiting examples, with reference to the accompanying drawings, in which:

FIG. 1a and FIG. 1c illustrate non-limiting examples of network architecture of FIG. 1;

FIG. 1b illustrates 5G User Plane Protocol Stack as known in the art;

DETAILED DESCRIPTION

Figure 1:
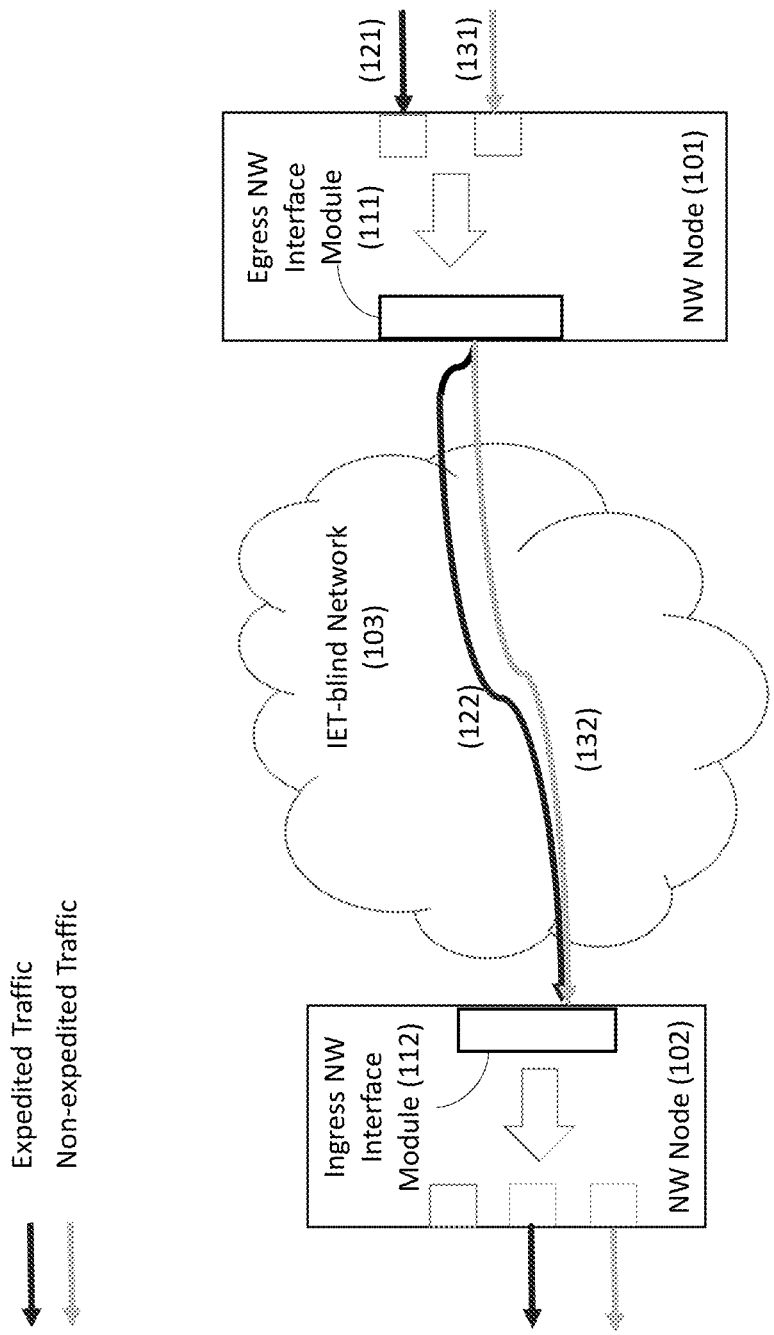
FIG. 1 illustrates a generalized block diagram of a network architecture in accordance with certain embodiments of the presently disclosed subject matter.

In the following detailed description, numerous specific details are set forth in order to provide a thorough understanding of the invention. However, it will be understood by those skilled in the art that the presently disclosed subject matter may be practiced without these specific details. In other instances, well-known methods, procedures, components and circuits have not been described in detail so as not to obscure the presently disclosed subject matter.

Unless specifically stated otherwise, as apparent from the following discussions, it is appreciated that throughout the specification discussions utilizing terms such as "processing", "computing", "representing", "comparing", "generating", "assessing", "matching", "updating" or the like, refer to the action(s) and/or process(es) of a computer that manipulate and/or transform data into other data, said data represented as physical, such as electronic, quantities and/or said data representing the physical objects. The term "computer" should be expansively construed to cover any kind of hardware-based electronic device with data processing capabilities including, by way of non-limiting example, the network nodes and processing circuitry therein disclosed in the present application.

The operations in accordance with the teachings herein may be performed by a computer specially constructed for the desired purposes or by a general-purpose computer specially configured for the desired purpose by a computer program stored in a non-transitory computer-readable storage medium.

Bearing this in mind, attention is drawn to FIG. 1a illustrating a schematic network architecture in accordance with certain embodiments of the presently disclosed subject matter. Network (NW) node 101 is configured to receive Ethernet frames with different priorities. The Ethernet frames with the highest priority are referred to hereinafter as "expedited frames", and the Ethernet frames with lower priorities are referred to hereinafter as "non-expedited frames".

The received frames bear indication (referred to hereinafter as "expediting" indication) of whether they are expedited frames or not. By way of non-limiting example, expedited frames 121 can be received from a time-sensitive application via a dedicated port, while non-expedited frames 131 can be received via other one or more ports. In this case, the port number can be used as "expediting" indication (the term "port" used in this patent application covers physical and logical port implementations). By way of another non-limiting example, the expedited and non-expedited frames can be received from an IET-enabled network node configured in accordance with IEEE802.1Qbu and IEEE802.3br standards. In this case, the eMAC and pMAC structures can be used as "expediting" indication. In this case, the expedited frames can be received via the same port with the non-expedited frames or via a different port.

NW node 101 is configured to communicate with a plurality of NW nodes via IET-blind Network 103. For purpose of illustration only, the following description is provided for point-to-point operative connection between NW node 101 and NW node 102. Those skilled in the art will readily appreciate that the teachings of the presently disclosed subject matter are, likewise, applicable to point-to-multipoint operative connections of NW 101 with the plurality of network nodes.

In accordance with certain embodiments of the presently disclosed subject matter, endpoint NW nodes 101 and 102 are connected by pre-provisioned network tunnels. One or more tunnels 122 are designated to expedited frames and one or more tunnels 132 are designated to non-expedited frames. The tunnels are specified by source and destination endpoints, a tunnel type defined by corresponding network protocol and a tunnel ID.

For purpose of illustration only, the following description is provided for a pair of network tunnels constituted by a tunnel designated to non-expedited traffic and a tunnel designated to expedited traffic between NW node 101 and NW node 102.

In certain embodiments a tunnel between NW nodes 101 and 102 can be constituted by several successive tunnels (referred to hereinafter as sub-tunnels), at least part of them being, optionally, of different types. Such tunnel is referred to hereinafter as a "composite tunnel" and is further detailed with reference to FIGS. 1a-1c. A composite tunnel is specified by sub-tunnels comprised therein and by source and destination endpoints. It is noted that the traffic within a composite tunnel is relayed to each next successive sub-tunnel. Relaying expedited traffic between sub-tunnels is provided with keeping priority requirement (e.g. strict priority requirements) for the expedited frames.

The tunnel's type depends on capabilities and architecture of network 103, available bandwidth, affordable size of overhead of the transmitted traffic, etc. Non-limiting examples of such tunnel (or sub-tunnels) pairs are illustrated in Table 1. Optionally, NW node 101 can be operatively connected with the same endpoint NW node by different tunnel pairs corresponding to different source addresses of the incoming traffic. Optionally, in point-to-multipoint embodiments, the NW node 101 can be operatively connected with different endpoint NW nodes by different tunnel pairs.

TABLE 1

Non-limiting examples of tunnel types in tunnel pairs.

| # | Protocol defining a type of tunnel (or sub-tunnel) for expedited traffic | Protocol defining a type of tunnel (or sub-tunnel) for non-expedited traffic | Tunnel ID |
|---|---|---|---|
| 1 | VLAN Stack 1 | VLAN Stack 2 | One or more VLAN Tags |
| 2 | GTP-U for PDU ETH | GTP-U for PDU Unstructured | GTP TEID |
| 3 | GTP-U for PDU ETH | GTP-U for PDU ETH | GTP TEID |
| 4 | VLAN1 | GTP-U for PDU ETH | GTP TEID |
| 6 | ETHoMPLS | ETHoGRE | GRE key |

NW node 101 comprises an egress NW interface module 111 configured to segment all non-expedited frames into segments, encapsulate the segments in accordance with a type of tunnel 132 and to send the encapsulated segments to NW node 102 via tunnel 132. Egress NW interface module 111 is further configured to send, with the highest priority, expedited frames to NW node 102 via tunnel 122.

The term "pre-provisioned tunnel" and alike used in this patent specification should be expansively construed to cover any tunnel provisioned between respective the endpoints prior to segmenting, at a source endpoint, a frame addressed to a destination endpoint.

NW node 102 comprises an ingress NW interface module 112 configured to receive the encapsulated segments and reassemble, upon decapsulation, into reassembled non-expedited frames. Ingress NW interface module 112 is further configured to receive the expedited frames 121.

Operation of NW nodes 101 and 102 and NW interface modules therein is further detailed with reference to FIGS. 1a-1c and FIGS. 2-5.

Referring to FIG. 1a, there is illustrated a non-limiting example of IET-blind network 103. In the illustrated example, node 101 is configured to receive frames from IET-enabled network 150, wherein eMAC and pMAC structures are usable as "expediting" indication. Network 103 is 5G network configured to operate in accordance with 3GPP standard TS 23.501 version 16.6.0 Release 16, and comprises at least one 5G base-station (gNB) 143 and at least one radio link 144. NW node 101 is configured to provide a User Plane Function (UPF) and to serve as an interconnect point between the 5G mobile network and data network 150. NW node 102 is configured to provide User Equipment (UE) function and to serve as a 5G modem interconnecting radio link 144 and data network and/or end user device(s).

It is noted that in the following description term "UPF node" or "UPF network node" should be expansively construed to cover any network node configured to provide UPF function.

Protocol Data Units (PDUs) are carried, through the UPF 101, between data network 150 and UE 102 over PDU-sessions (denoted 145-1 and 145-2). PDU sessions enable end-to-end user plane connectivity between the UE and the data network. User Plane Protocol Stack between UE and UPF is illustrated in FIG. 1b.

PDU layer corresponds to PDUs carried over PDU Session. PDU sessions can be of various types corresponding to the types of carried traffic. The GPRS tunnelling protocol for the user plane (GTP-U) enables traffic tunnelling via 5G core network (from UPF 101 to gNB 143) and provides per-PDU-session encapsulation. gNB 143 relays the traffic between tunnels corresponding to a given PDU, i.e. decapsulates the frames from GTP-U per-PDU-session encapsulation and encapsulate it, per-PDU-session, into 5G-AN protocol stack.

As was detailed in FIG. 1, egress NW interface module 111 of node 101 provides segmentation of all non-expedited frames into segments, encapsulates the segments and sends the encapsulated segments to NW node 102 via tunnel 132 pre-provisioned for non-expedited traffic. Egress NW interface module 111 further sends expedited frames to NW node 102 via tunnel 122 pre-provisioned for expedited traffic. In the example illustrated in FIG. 1a, tunnels 122 and 132 are composite tunnels corresponding to PDU sessions 145-1 and 145-2. Expedited frames are carried over PDU session 145-1 of "Ethernet type", and the segments of non-expedited frames are carried over PDU session 145-2 of "unstructured type".

Thus, the tunnel designated to expedited frames (denoted as 122 in FIG. 1 and corresponding to PDU session 145-1) comprises sub-tunnel GTP-U relayed to 5G-AN based sub-tunnel. Likewise, tunnel designated to segments of non-expedited frames (denoted as 132 in FIG. 1 and corresponding to PDU session 145-1) comprises sub-tunnel GTP-U relayed to 5G-AN-protocol-stack based sub-tunnel. It is noted, that, optionally, per PDU session, there can be several GTP-U sub-tunnels relayed therebetween, depending on the network path from UPF to UE.

When the designated tunnel is constituted by a plurality of successive sub-tunnels, initial encapsulation of each segment is provided in accordance with a first sub-tunnel in the plurality of sub-tunnels and, when swapping to a next sub-tunnel, the encapsulation is accordingly relayed.

Figure 1C:
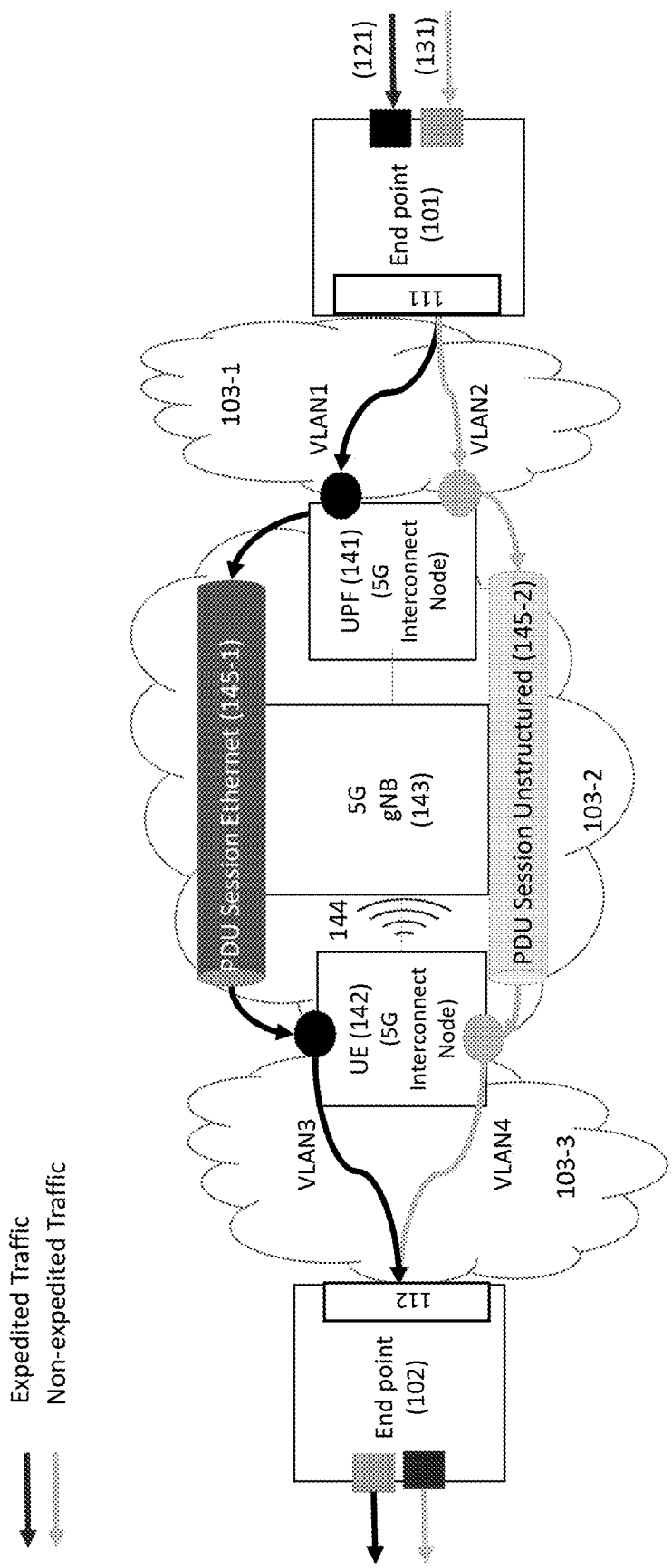

Another non-limiting example of IET-blind network 103 is illustrated in FIG. 1c. In the illustrated example, network 103 between endpoint nodes 101 and 102 comprises 5G network 103-2 interconnected with data network 103-1 via NW node 141 and with data network 103-3 via NW node 142. Data networks 103-1 and 103-3 can be packet-switched networks. 5G network 103-2 is configured to operate in accordance with standard 3GPP TS 23.501 version 16.6.0 Release 16. NW node 141 is configured to provide a User Plane Function (UPF) and to serve as an interconnect point between the 5G mobile network and data network 103-1. NW node 142 is configured to provide User Equipment (UE) function and to serve as a 5G modem configured to interconnect radio link 144 and data network 103-3. 5G network 103-2 further comprises at least one 5G base-station (gNB) 143 and at least one radio link 144.

As was detailed above, egress NW interface module 111 of node 101 provides segmentation of all non-expedited frames into segments, encapsulates the segments and sends the encapsulated segments to NW node 102 via tunnel 132 pre-provisioned for non-expedited traffic. Egress NW interface module 111 further sends expedited frames to NW node 102 via tunnel 122 pre-provisioned for expedited traffic.

In the example illustrated in FIG. 1c tunnels 122 and 132 are composite tunnels. The tunnel designated to expedited frames comprises VLAN1 sub-tunnel, a plurality of relayed sub-tunnels corresponding to PDU session 145-1 and VLAN3 sub-tunnel. Egress NW interface module 111 encapsulates expedited frames into VLAN1 between node 101 and UPF node 141; UPF node 141 relays VLAN1 to GTP-U sub-tunnel further relayed as detailed in FIGS. 1a-b with reference to PDU session 145-1; and UE node 142 relays the received 5G-AN-protocols based sub-tunnel into VLAN3 sub-tunnel to node 102.

Likewise, the tunnel designated to the segments of non-expedited frames comprises VLAN2 sub-tunnel, a plurality of relayed sub-tunnels corresponding to PDU session 145-2, and VLAN4 sub-tunnel. Egress NW interface module 111 encapsulates segments of non-expedited frames into VLAN2 between node 101 and UPF node 141; UPF node 141 relays VLAN2 to GTP-U further relayed as detailed in FIGS. 1a-b with reference to PDU session 145-2; and UE node 142 relays the received 5G-AN-protocol-stack based sub-tunnel into VLAN3 sub-tunnel to node 102.

It is noted that the teachings of the presently disclosed subject matter are not bound by the network architecture and NW nodes configuration described with reference to FIGS. 1, 1a and 1c. Equivalent and/or modified functionality can be consolidated or divided in another manner and can be implemented in any appropriate combination of software with firmware and/or hardware and executed on suitable devices. In certain embodiments, expedited frames can be associated with QoS marks and the prioritized transmission thereof can be provided via a tunnel shared with the segments of non-expedited frames. In other embodiments, expedited frames can be associated with QoS marks and the prioritized transmission thereof can be provided without tunnel encapsulation.

Figure 2:
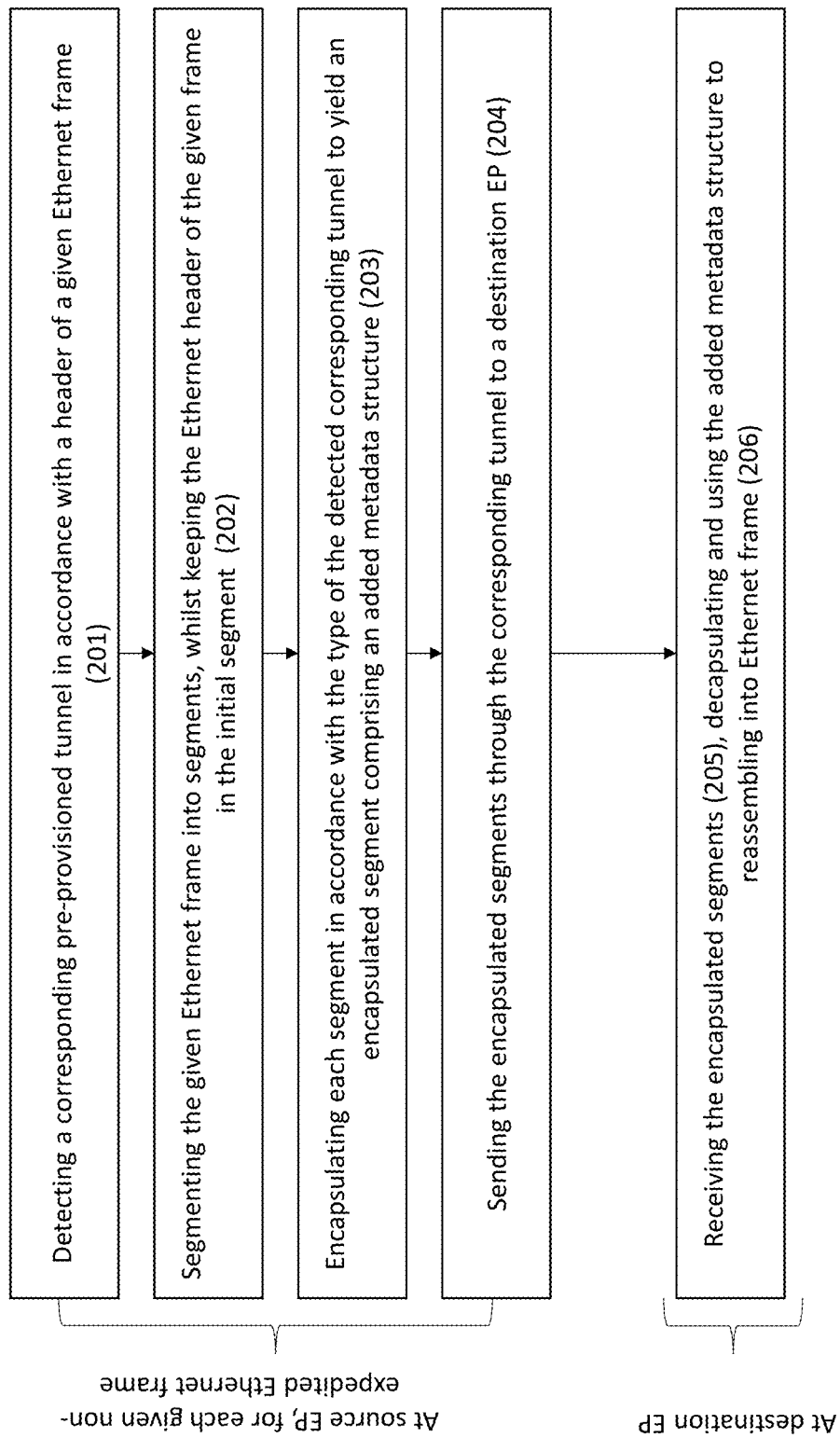
FIG. 2 illustrates a generalized flow-chart of handling non-expedited traffic in accordance with certain embodiments of the presently disclosed subject matter.

Referring to FIG. 2, there is illustrated a generalized flow chart of transferring the non-expedited frames in accordance with certain embodiments of the presently disclosed subject matter. For each received non-expedited frame, NW node 101 detects (201), among the plurality of pre-provisioned tunnels, a tunnel corresponding to the given frame, i.e. having the destination specified in the header of the frame and pre-provisioned for non-expedited traffic.

NW node 101 provides segmentation of all non-expedited frames. Each non-expedited Ethernet frame that is larger than a predefined threshold size (referred to hereinafter as "large" frame) is segmented by NW node 101 into segments of predefined size (202). A first segment (referred to hereinafter as an initial segment) of each given original frame keeps an Ethernet header of the corresponding frame. When an original frame comprises a VLAN Stack, said original VLAN Stack can be kept in the first segment or can be removed thereof, depending on network provisioning. It is noted that a size of a last segment can be less than the predefined size. When the size of the last segment is less than the minimal transmission size, such last segment can be appended to a previous segment to yield in a single segment. Optionally, the last segment can be padded (e.g. to the minimal transmission size and/or to the predefined size), in such embodiments a control word (detailed with reference to FIGS. 3a-3e below) shall comprise also data informative of the original length. A frame smaller than a predefined threshold size (referred to hereinafter as "small" frame) is not modified during the segmentation.

NW node 101 further encapsulates (203) each segment in accordance with the type of a tunnel detected as corresponding to a respective non-expedited frame, thereby giving rise to an encapsulated segment. Each encapsulated segment comprises a metadata structure (referred to hereinafter as a "shim metadata" or "shim") added to a payload of each segment (i.e. inserted in the payload, prepended or postpended thereto) and usable for further reassembling the frames at the destination endpoint (NW node 102). The added metadata structure is informative, at least, of the sequence number of the original frame, the segment's sequence number therein and a type of the segment (the type is indicative of the segment's relative location in the sequence of segments). For some types of the tunnels, encapsulating comprises prepending to a segment a tunnel-informative overhead or inserting a tunnel-informative data within a payload.

After the encapsulation, the initial segment of a given frame keeps therein the Ethernet header of the given frame. NW node 101 (e.g. egress NW interface module 111) encapsulates the small frames in the same manner as the initial segments of the large frames. It is noted that the term "initial encapsulated segment" refers both to the initial encapsulated segments of the large frames and to encapsulated small frames that have passed segmentation without a modification. It is further noted that for the segments keeping the original Ethernet header (i.e. initial segments and "small" frames), prepending is provided at the beginning of said header. Segments other than initial segments or "small" frames are referred to hereinafter as "non-initial" segments.

Non-limiting examples of the encapsulated segments are illustrated with reference to FIGS. 3a-3e and are summarized in Table 2.

Figure 3A:
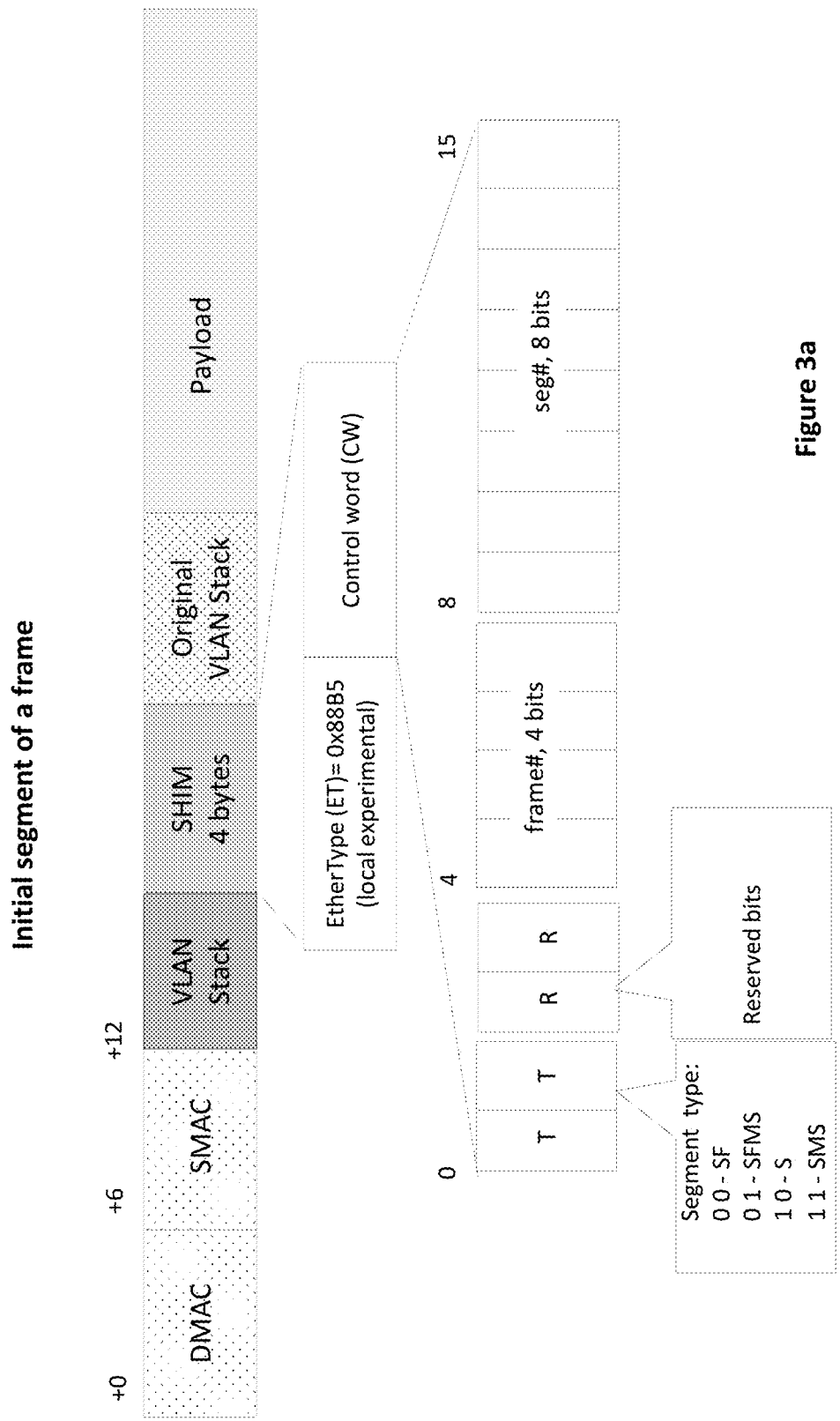
FIGS. 3a-3e illustrate non-limiting examples of the encapsulated segments in accordance with certain embodiments of the presently disclosed subject matter.
Figure 3B:
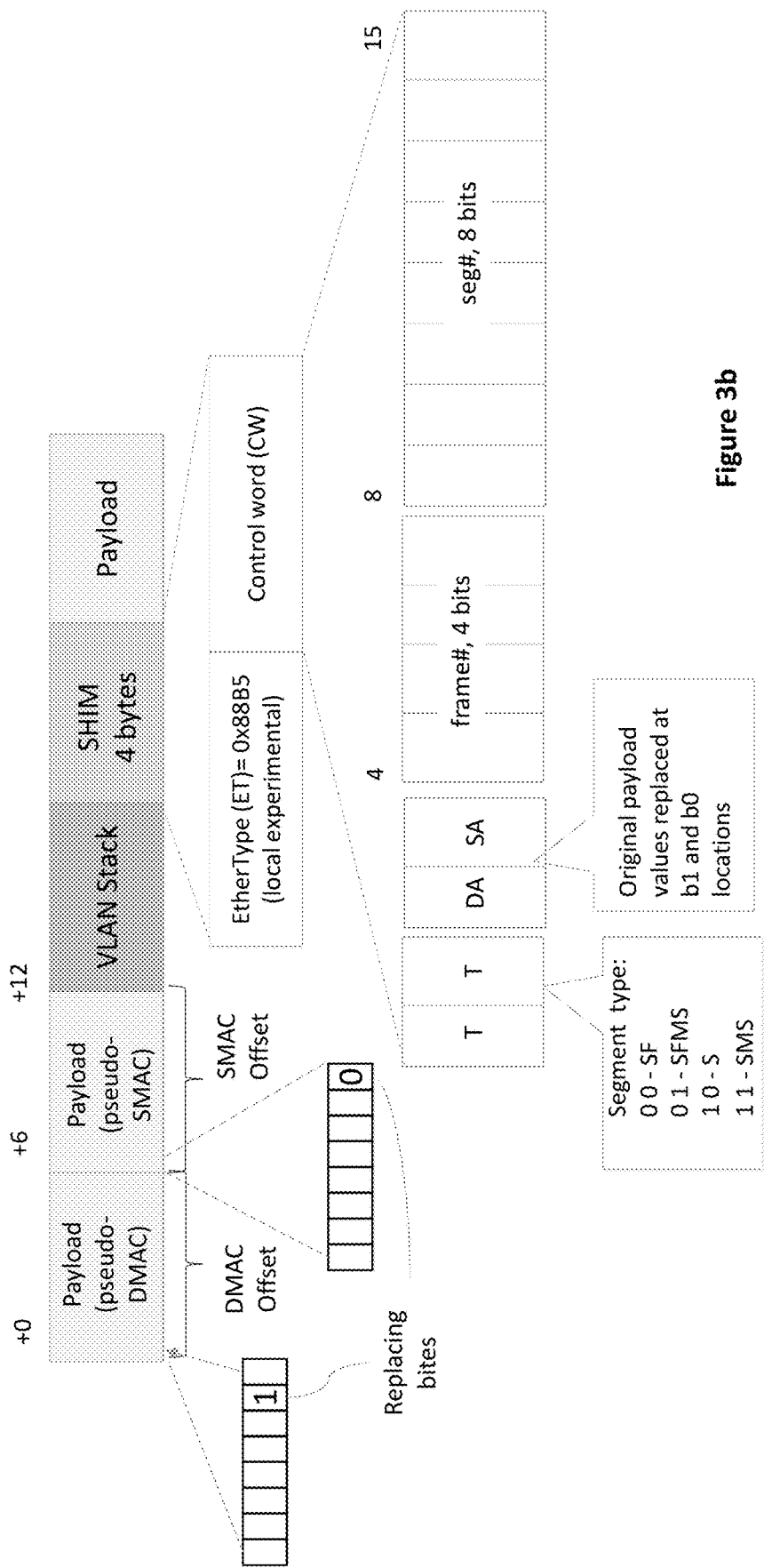

Referring to FIGS. 3a-3b, there is illustrated encapsulation of a segment for a required VLAN tunnel. FIG. 3a illustrates encapsulating of an initial segment. As illustrated, the segment comprises destination and source MAC addresses as were specified in the original frame. The segment further comprises a new VLAN Stack inserted at the standard VLAN offset (+12 bytes). The VLAN Stack can comprise one or more VLAN Tags specifying the required VLAN tunnel. The VLAN Stack is followed by 4 bytes shim.

The shim comprises EtherType (ET) indicative that the segment is to be used for reassembling at the destination endpoint and enabling unified flow type for all segments. The shim further comprises a control word (CW) informative of a sequence number of the original frame and the sequence number of the encapsulated segment within the sequence of the fragment's segments. CW is further informative of a type of the segment: "start frame" segment (SF), "start frame, more segments" (SFMS), "segment" (S) and "segment, more segments" (SMS).

FIG. 3b illustrates encapsulation of a non-initial segment. As illustrated, tunnel-informative data, i.e. VLAN Stack comprising one or more VLAN Tags specifying to the required VLAN tunnel, is inserted at the standard VLAN Tag offset (+12 bytes) and is followed by 4 bytes shim. Payload between +0 and +12 offset is kept unchanged except of 2 bits as detailed below. Payload data (optionally, with modified 1 bit) at +0 to +5 offset is used as a pseudo-DMAC (destination MAC) address and payload data (optionally, with modified 1 bit) at +6 to +11 offset is used as a pseudo-SMAC (source MAC) address. To be transferred via a VLAN tunnel, an encapsulated segment shall be considered by intermediate NW nodes (not shown) on a path between NW nodes 101 and 102 as a valid Ethernet frame. It is noted that due to VLAN tunnelling, the real values of DMAC and SMAC are not relevant for an intermediate NW node. Accordingly, the intermediate nodes will read the pseudo-DMAC and pseudo-SMAC as if they are DMAC and SMAC addresses. Thus, the encapsulated segment can be transmitted via the VLAN tunnel as pseudo-Ethernet frame. In order to assure validity of pseudo-MAC addresses, NW node 101 further inserts for pseudo-DMAC address value "1" at location of bit "b1" and inserts for pseudo- SMAC address value "0" at location of bit "b0" in the first octets of location of the respective addresses in the payload. Value "0" at location of bit "b0" is indicative of unicast transmission and value "1" at location of bit "b1" is indicative of locally administered address. After such modifications, the pseudo-MAC addresses will be considered as valid by the intermediate NW nodes.

The shim in a non-initial segment also comprises EtherType (ET) followed by a control word (CW) informative of a sequence number of the original frame, the sequence number of the encapsulated segment within the sequence of the fragment's segments. and a type of the segment. The original payload values replaced at b 1 and b0 locations and usable during frame reassembling are also stored in the CW.

Figure 3C:
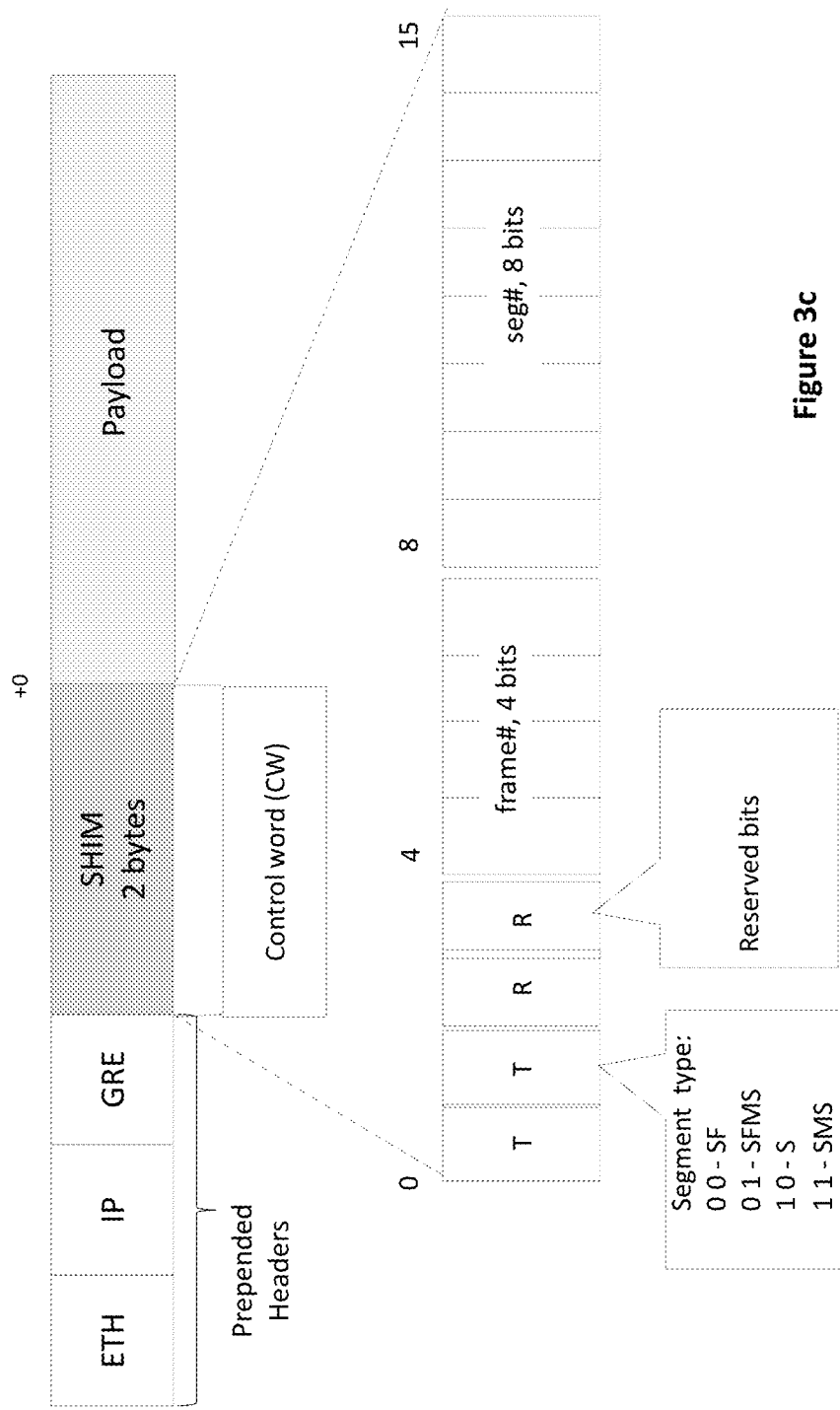
Figure 3D:
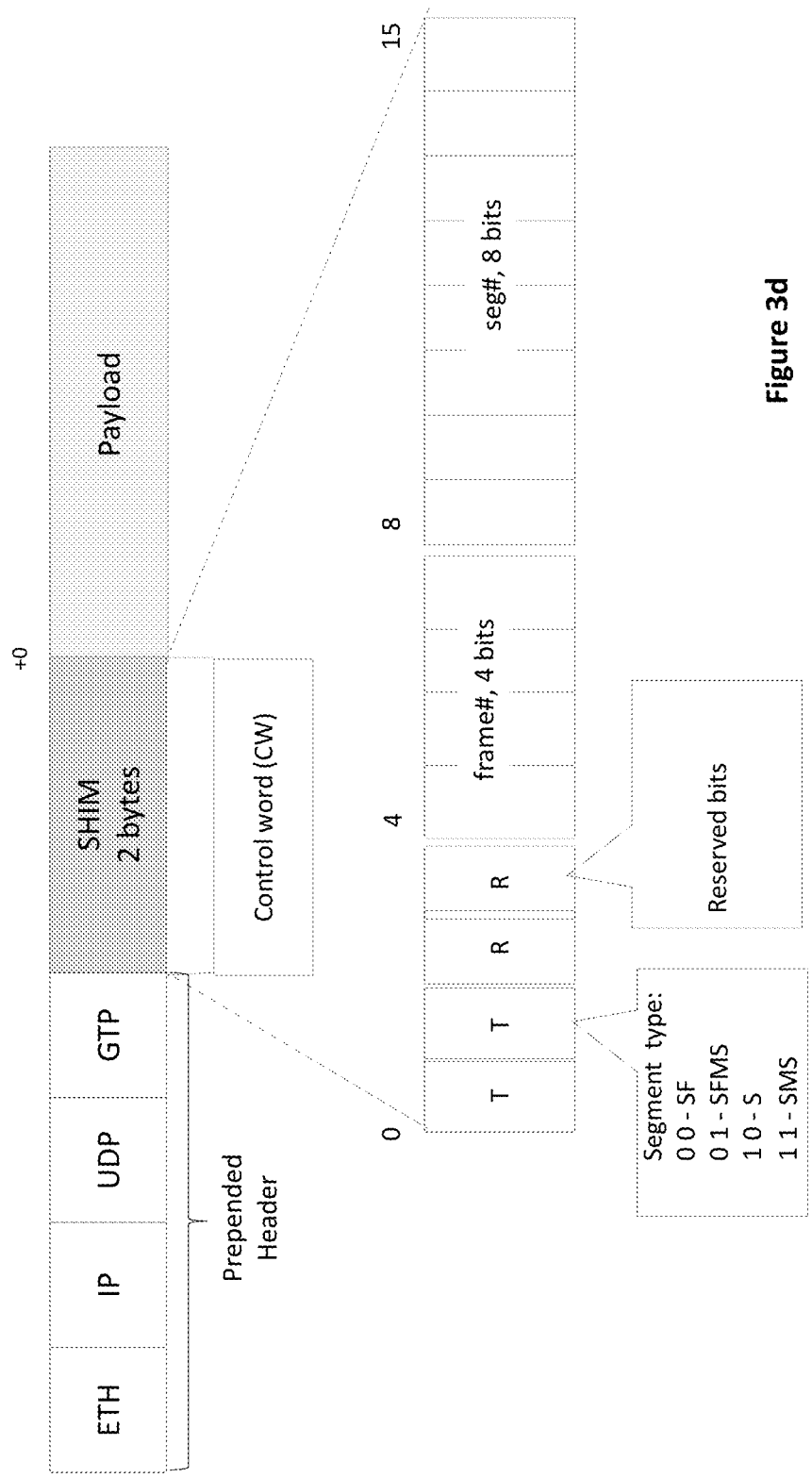

FIG. 3c illustrates encapsulation of a non-initial segment for ETHoGRE tunnel and FIG. 3d illustrates encapsulation of a non-initial segment for GTP tunnel/unstructured PDU session. In both cases the respective encapsulation headers (ETH+IP+GRE in FIG. 3b and ETH+IP+UDP+GTP-U in FIG. 3c) followed by shim are prepended to a payload of the segment. Shim comprises a control word informative of a sequence number of the original frame, the sequence number of the encapsulated segment within the sequence of the segments and the type of the segment.

Figure 3E:
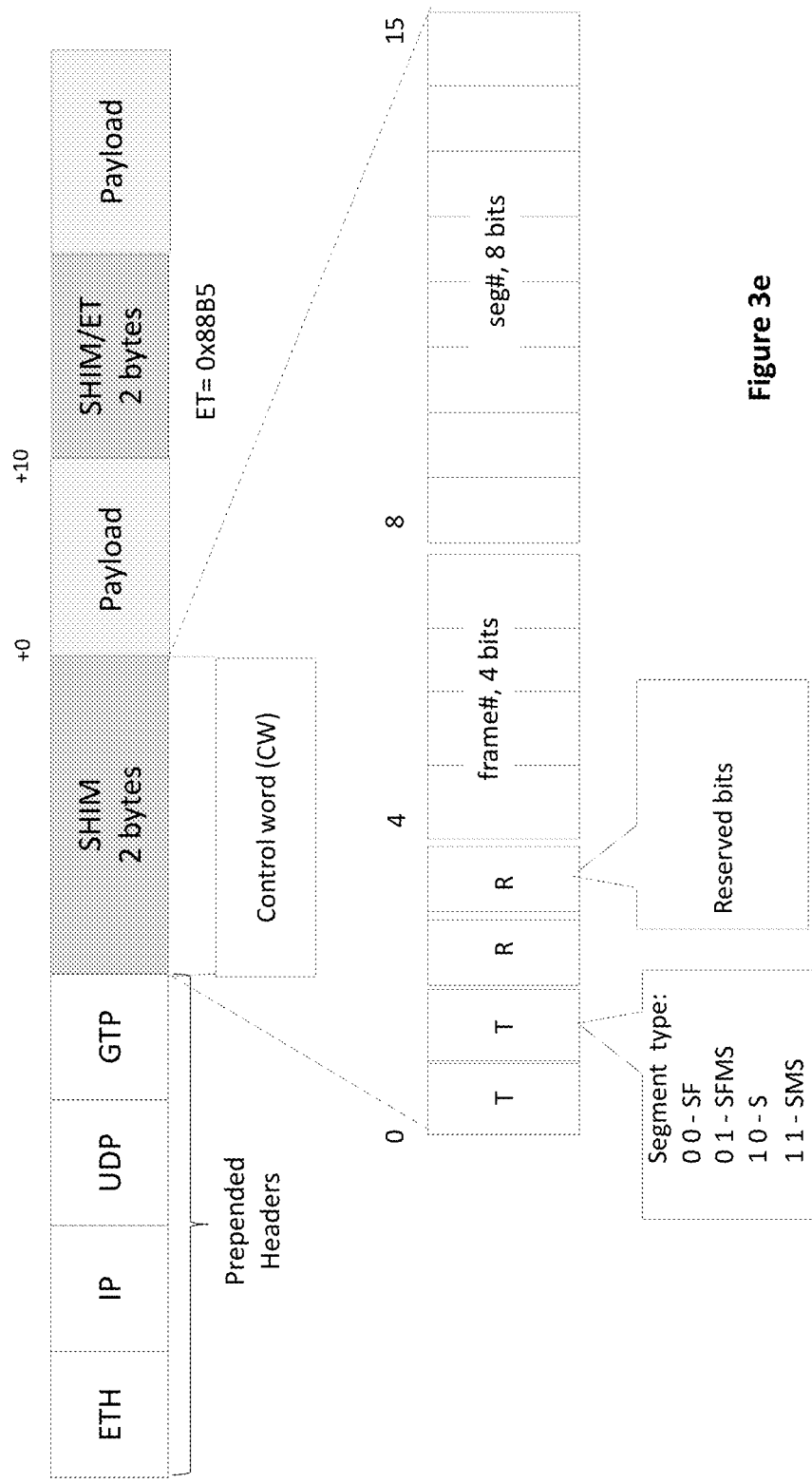

FIG. 3e illustrates encapsulation of a non-initial segment for GTP tunnel/Ethernet PDU session. Likewise in the case of GTP/unstructured PDU session encapsulation illustrated in FIG. 3d, the respective encapsulation headers are prepended to the payload. The shim data structure comprises two parts located at different offsets. CW has the same structure as illustrated in FIG. 3d and is prepended to the payload. The shim further comprises EtherType (ET) inserted into the payload and indicative that the segment is to be used for reassembling at the destination endpoint.

In is noted with reference to FIGS. 3c-3d that the encapsulation header and the shim in an encapsulated initial segment are prepended to the original Ethernet header.

It is noted that for Ethernet PDU session, relaying from GTP-U to 5G-AN-protocol-stack based encapsulation can require valid MAC addresses (e.g. for compression of Ethernet headers). In such embodiments, respective parts of the segment's payload of non-initial segments can be used as pseudo-MAC addresses and their validity can be assured in a manner detailed with reference to FIG. 3b.

It is further noted that in some embodiments, when encapsulated segments are provided upon relaying from VLAN, the structure of the shim in such re-encapsulated segments can be kept the same as was provided during VLAN encapsulation (e.g. as illustrated in FIGS. 3a-3b).

TABLE 2

Non-limiting examples of encapsulated segments

| Protocol defining a type of tunnel | Tunnel-informative overhead (OH) | Shim |
|---|---|---|
| VLAN | Inserted VLAN tag(s) | Inserted (ET + CW) |
| ETHoGRE | Prepended (ETH + IP + GRE) headers | Prepended CW |
| GTP/PDU session Unstructured | Prepended (ETH + IP + UDP + GTP-U) headers | Prepended CW |
| GTP/PDU session Ethernet | Prepended (ETH + IP + UDP + GTP-U) headers | Inserted ET + prepended CW |

Referring back to FIG. 2, the size of the segments and the threshold size is defined in accordance with latency-bounding requirements for time-sensitive applications. As an expedited frame bears the highest priority, it is transmitted prior to any segment to be sent via a shared port. Thus, a delay in sending the expedited frame depends on the time required for completion of yet not finished transmission of a segment. On the other hand, the latency in a pass between the endpoint NW nodes 101 and 102 depends on the sum of delays at the respective intermediate NW nodes. Accordingly, the size of the segments shall be optimized considering latency reduction due to reducing the size of the segments and latency increase due to increasing the network pass-through time of processing overheads for the increased number of the segments in a single frame. By way of non-limiting example, in certain embodiments (e.g. for VLAN encapsulation) the size of segment can be predefined as equal to 64 or 128 bytes.

NW node 101 sends (204) each encapsulated segment through the corresponding tunnel to the destination endpoint (e.g. NW node 102).

Destination endpoint receives and decapsulates (205) the encapsulated segments and uses the shim metadata to reassemble (206) the segments into non-expedited Ethernet frames.

With regard to the expedited frames, NW node 101 assigns to a given expedited frame the highest priority, defines a corresponding tunnel and, upon respective encapsulation, sends the frame through the defined tunnel with highest priority indication.

Figure 4:
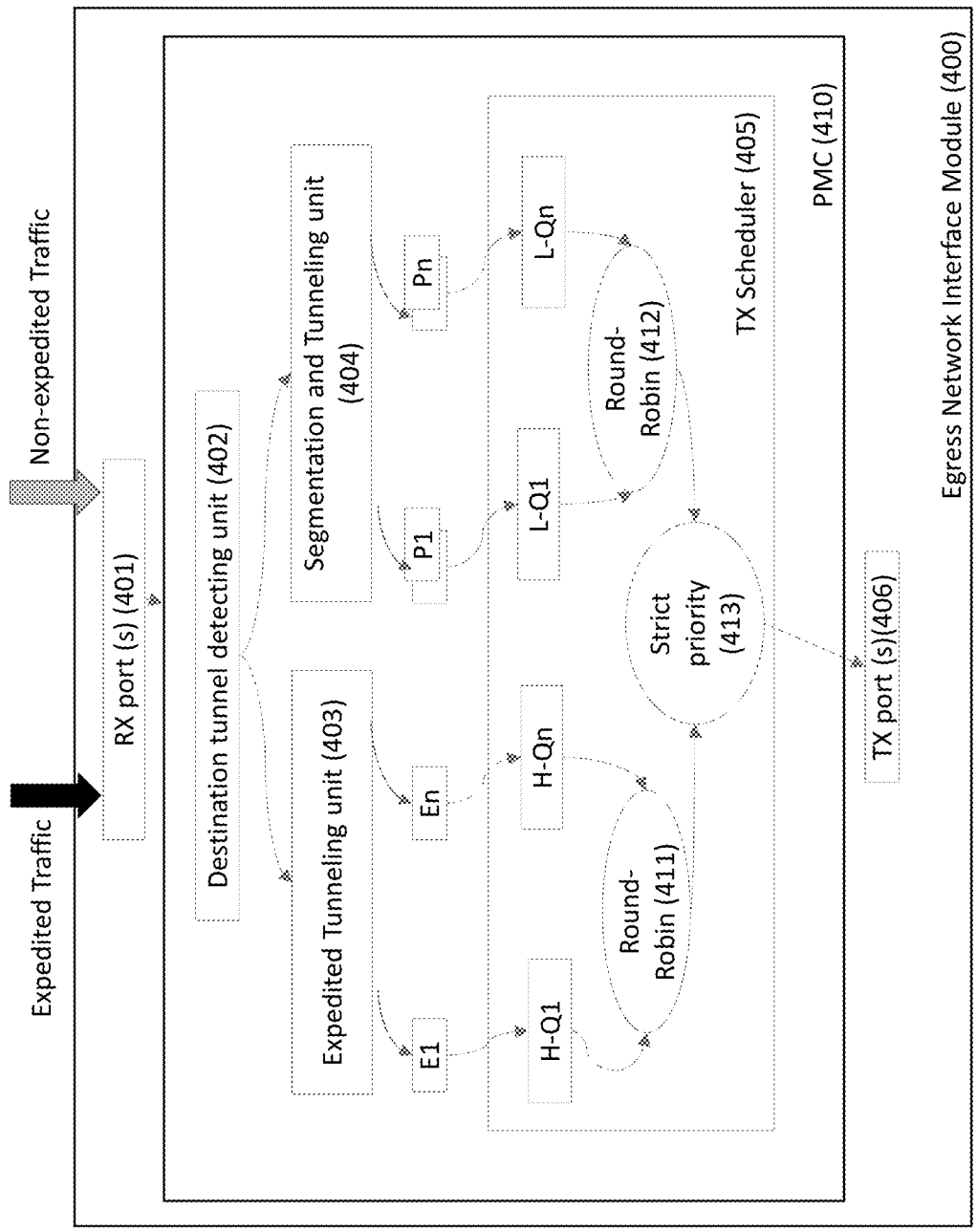
FIG. 4 illustrates a generalized block diagram of an egress NW interface module configured in accordance with certain embodiments of the presently disclosed subject matter.

In certain embodiments, operations 201-204 can be provided by an egress NW interface module illustrated in FIG. 4. Egress NW interface module 400 comprises a processing and memory circuitry (PMC) 410 operatively connected to one or more Rx ports 401 and one or more Tx ports 406. The one or more Rx ports 401 are configured to receive expedited traffic and non-expedited traffic and forward the received traffic to the PMC in a manner enabling distinguishing by PMC between expedited and non-expedited Ethernet frames. The one or more Tx ports are configured to enable tunnelling of the expedited traffic and non-expedited traffic via the respective tunnels.

PMC 410 comprises a processor and a memory (not shown separately within the PMC). PMC 410 can be configured to execute several functional units in accordance with computer-readable instructions implemented on a non-transitory computer-readable storage medium. Such functional units are referred to hereinafter as comprised in the PMC. The functional units can be implemented in any appropriate combination of software with firmware and/or hardware. PMC 410 can comprise the following functional units: destination tunnel detecting unit 402, expedited tunnelling unit 403, segmentation and tunnelling unit 404 and Tx scheduler 405.

Destination tunnel detecting unit 402 is configured to detect, for each given Ethernet frame, a pre-provisioned destination tunnel corresponding to a type of the frame (expedited or non-expedited) and metadata specified in the header of the frame. Destination tunnel detecting unit 402 further forwards the expedited frames to expedited tunnelling unit 403 that encapsulates each expedited frame in accordance with the respectively detected pre-provisioned tunnel and assigns indication of the highest priority. Unit 403 further sends the encapsulated expedited frames (denoted as E1-En) to TX scheduler 405 that places the encapsulated expedited frames into the highest-priority queues (denoted H-Q1-H-Qn) arranged per destinations. Upon fair scheduling (e.g. by a highest-priority-dedicated Round-Robin scheduler 411), the encapsulated frames in the highest priority queues pass to a strict priority scheduler 413.

In a similar manner, destination tunnel detecting unit 402 forwards the non-expedited frames to segmentation and tunnelling unit 404 that segments the non-expedited frames and encapsulates the segments thereof as was detailed above with reference to FIGS. 2-3. The encapsulated segments (denoted P1-Pn) are sent to TX scheduler 405 to lower-priority queues (denoted L-Q1-L-Qn) arranged per destinations. Upon fair scheduling (e.g. by a lower-priority-dedicated Round-Robin scheduler 412), the encapsulated segments in the lower priority queues also pass to strict priority scheduler 413 enabling strict-priority forwarding of the high-priority encapsulated frames and the low-priority encapsulated segments to the one or more TX ports 406. Due to the strict priority scheduling, egress traffic from the highest priority queue is transmitted first; thus, for each given expedited Ethernet Frame, the forwarding delay is limited by the size of one encapsulated segment.

It is noted that the teachings of the presently disclosed subject matter are not bound by the egress NW interface module described with reference to FIG. 4. Equivalent and/or modified functionality can be consolidated or divided in another manner and can be implemented in any appropriate combination of software with firmware and/or hardware and executed by the egress NW interface module or, at least partly, by other modules of the source endpoint.

Figure 5:
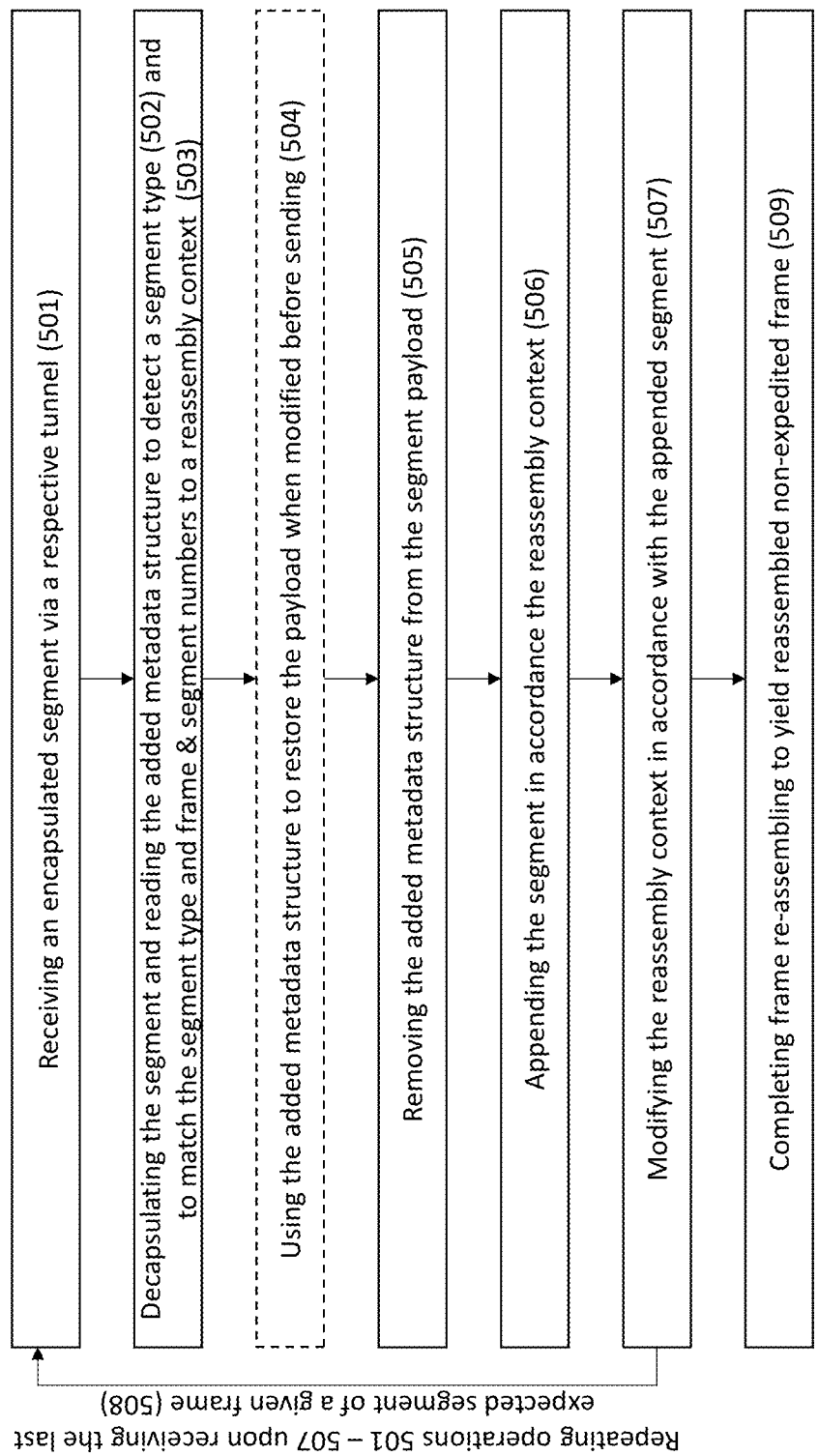
FIG. 5 illustrates a generalized flow-chart of reassembling non-expedited Ethernet frames in accordance with certain embodiments of the presently disclosed subject matter.

Referring to FIG. 5, there is illustrated a generalized flow-chart of reassembling non-expedited Ethernet frames at the destination endpoint in accordance with certain embodiments of the presently disclosed subject matter. Upon receiving (501) an encapsulated segment via a respective tunnel, the destination endpoint decapsulates the segment and reads (502) shim metadata. The destination NW node uses EtherType (0x88B5) to define the size of VLAN Stack and the location of the control word. Further, the destination NW node reads the control word to define a segment type and frame and segment numbers.

The destination endpoint further matches (503) the segment type along with the frame and segment numbers to a current reassembly context. The reassembly context is informative of expected frame and segment numbers and of in-process data (if any) comprised in a reassembling buffer. As was detailed with reference to FIGS. 3a-3d, segment type (e.g. "start frame" segment (SF), "start frame, more segments" (SFMS), "segment" (S) and "segment, more segments" (SMS)) is indicative of the segment's relative location in the sequence of the frame's segments and of an expectation of a next segment.

When the bits within the payload have been modified before sending the segment, shim metadata is further used to restore (504) the payload. By way of non-limiting example, for VLAN encapsulation detailed with reference to FIG. 3a, shim metadata can be used to restore the bits replaced in the payload during the encapsulation. By way of another non-limiting example, shim metadata can include the original length of a padded segment (if any), thus can be used for restoring the original payload.

Shim metadata is further removed (505) from the segment payload, and the payload of the segment is appended (506) to a reassembling payload in accordance with the reassembly context. Upon appending the segment, the reassembly context is modified (507) accordingly (i.e. updating expected frame and segment numbers and of in-process data (if any) comprised in a reassembling buffer). Operations 501-507 are repeated (508) for each next segment upon receiving all expected segments of a given frame (509). Thus, the frame reassembling is completed (510). It is noted that the Ethernet frame header is automatically inserted with appending the initial segment ("start frame" type).

It is to be understood that the invention is not limited in its application to the details set forth in the description contained herein or illustrated in the drawings. The invention is capable of other embodiments and of being practiced and carried out in various ways. Hence, it is to be understood that the phraseology and terminology employed herein are for the purpose of description and should not be regarded as limiting. As such, those skilled in the art will appreciate that the conception upon which this disclosure is based may readily be utilized as a basis for designing other structures, methods, and systems for carrying out the several purposes of the presently disclosed subject matter.

It will also be understood that the system according to the invention may be, at least partly, implemented on a suitably programmed computer. Likewise, the invention contemplates a computer program being readable by a computer for executing the method of the invention. The invention further contemplates a non-transitory computer-readable memory tangibly embodying a program of instructions executable by the computer for executing the method of the invention.

Those skilled in the art will readily appreciate that various modifications and changes can be applied to the embodiments of the invention as hereinbefore described without departing from its scope, defined in and by the appended claims.

The invention claimed is:

1. A method of time-sensitive transmission of expedited and non-expedited Ethernet frames between network nodes operatively connected via an IET-blind communication network, the method comprising:

pre-provisioning the communication network to create a first plurality of pre-provisioned tunnels designated to non-expedited Ethernet traffic and a second plurality of pre-provisioned tunnels designated to expedited Ethernet traffic, each tunnel specified, at least, by source and destination endpoint network nodes and by one or more respective network protocol;

at a source endpoint network node for each non-expedited Ethernet frame that is larger than a predefined threshold size:

upon receiving a given non-expedited frame that is larger than a predefined threshold size, detecting, among the first plurality of pre-provisioned tunnels, a tunnel starting at the source endpoint network node and with a destination endpoint network node corresponding to a destination address specified in the given non-expedited Ethernet frame, thereby giving rise to a designated non-expedited tunnel, wherein the designated non-expedited tunnel comprises a VLAN tunnel starting at the source endpoint network node and passes through an intermediate network node;

providing segmentation of the given non-expedited Ethernet frame to yield a plurality of segments constituting the given frame;

encapsulating each segment from the plurality of segments in accordance with the designated non-expedited tunnel, thereby giving rise to a plurality of encapsulated segments comprising an initial segment and one or more non-initial segments, wherein each given encapsulated segment comprises a metadata structure added, at the source endpoint network node, to a payload of the given segment and usable for further reassembling the frame at the destination endpoint network node, and wherein the metadata structure is informative, at least, of sequence numbers of the frame and the given segment and a type of segment indicative of a relative location of the given segment within a sequence of segments from the plurality of segments;

for each given non-initial encapsulated segment, using the payload of the given segment to enable its transmission via the intermediate network node as an encapsulated pseudo-Ethernet frame, wherein the enabling transmission of a given non-initial encapsulated segment as a pseudo-Ethernet frame comprises:

enabling reading, by the intermediate network node, at +0 to +5 offset of the payload of the given segment as pseudo-DMAC (destination MAC) address by inserting therein an indication of a locally administrated address, thereby assuring validity of the pseudo-DMAC address and enabling reading, by the intermediate network node, data at +6 to +11 offset of the payload as a pseudo-SMAC (source MAC) address by inserting therein an indication of unicast transmission, thereby assuring validity of pseudo-SMAC address, wherein the indications are inserted by replacing original payload bits at the locations designated to said indications;

inserting at +12 offset of the payload of the given segment VLAN tag of the VLAN tunnel; and storing the original payload bits in the added metadata structure, the stored original payload bits to be used for reassembling the given non-expedited Ethernet frame; and sending each encapsulated segment from the plurality of encapsulated segments to the destination endpoint network node via the designated non-expedited tunnel.

2. The method of claim 1, further comprising: receiving at the destination endpoint network node the plurality of encapsulated segments of the given non-expedited Ethernet frame, decapsulating each encapsulated segment and using the added metadata structure to reassemble the given non-expedited Ethernet frames.

3. The method of claim 2, wherein reassembling the given non-expedited Ethernet frame comprises:

a. reading metadata structure added to a given segment and matching the obtained type of the given segment along with the frame and segment numbers to a current reassembly context;

b. removing the added metadata structure from a payload of the given segment, appending the payload of the given segment to a reassembling payload in accordance with the reassembly context and modifying the reassembly context accordingly; and c. repeating operations a) and b) for each next segment upon receiving all expected segments of the given frame thereby completing reassembling of the given non-expedited Ethernet frame.

4. The method of claim 3, wherein each given encapsulated segment further comprises data informative of the non-expedited designated tunnel delivered the given segment, said data prepended to the payload or inserted into the payload of the encapsulated segment and is removed during re-assembling.

5. The method of claim 1, further comprising at the source endpoint network node:

for each expedited Ethernet frame detecting, among the second plurality of pre-provisioned tunnels, a tunnel starting at the source endpoint network node and with destination endpoint network node corresponding to a destination address specified in a given expedited Ethernet frame, thereby giving rise to a designated expedited tunnel;

encapsulating each expedited Ethernet frame in accordance with the designated expedited tunnel; and sending each encapsulated expedited Ethernet frame to the destination endpoint network node via the designated expedited tunnel.

6. The method of claim 1, further comprising associating, at the source endpoint network node, the expedited frames with QoS marks indicative of a strict highest priority and transmitting the expedited frames via the designated non-expedited tunnel shared with the segments of non-expedited frames.

7. The method of claim 1, wherein the designated non-expedited tunnel is constituted by a plurality of successive sub-tunnels, the method further comprising initial encapsulating each segment in accordance with a first of successive sub-tunnels and, when swapping to a next sub-tunnel in the plurality of successive sub-tunnels, relaying the encapsulation of each segment according to a network protocol characterizing the next sub-tunnel.

8. The method of claim 7, wherein the transmission of the Ethernet frames between the source and the destination endpoint network nodes comprises transmitting over a 5G mobile network, and wherein the plurality of successive sub-tunnels comprises a plurality of sub-tunnels corresponding to a PDU-session usable for transmitting the encapsulated segments over the 5G network.

9. The method of claim 8, wherein the transmission of Ethernet frames between the source and the destination endpoint network nodes further comprises transmitting the Ethernet traffic over a data network prior to transmitting it over the 5G mobile network interconnected with the data network with the help of an UPF (User Plane Function) network node, and wherein the designated non-expedited tunnel comprises a VLAN sub-tunnel between the source endpoint network node and the UPF network node, the VLAN sub-tunnel to be relayed at the UPF network node to the plurality of sub-tunnels corresponding to the PDU-session.

10. The method of claim 1, wherein the segments in the plurality of segments are of the same size, and wherein the size of the segments and the threshold size is defined in accordance with latency-bounding requirements of the time-sensitive transmission.

11. A network node configured to operate in an IET-blind communication network transmitting time-sensitive Ethernet traffic comprising expedited and non-expedited Ethernet frames, wherein the network node is configured to operate as a source node of a first plurality of pre-provisioned tunnels designated to non-expedited Ethernet traffic and of a second plurality of pre-provisioned tunnels designated to expedited Ethernet traffic, each tunnel specified, at least, by source and destination endpoint network nodes and by respective one or more network protocols, the network node configured to:

receive expedited and non-expedited Ethernet frames;

for each non-expedited Ethernet frame that is larger than a predefined threshold size:

detect, among the first plurality of pre-provisioned tunnels, a tunnel with a destination endpoint network node corresponding to a destination address specified in a given non-expedited Ethernet frame, thereby giving rise to a designated non-expedited tunnel, wherein the designated non-expedited tunnel comprises a VLAN tunnel starting at the network node and passes through an intermediate network node;

provide segmentation of the given non-expedited Ethernet frame to yield a plurality of segments constituting the given frame;

encapsulate each segment from the plurality of segments in accordance with the designated non-expedited tunnel, thereby giving rise to a plurality of encapsulated segments comprising an initial segment and one or more non-initial segments, wherein each given encapsulated segment comprises a metadata structure added, at the network node, to a payload of the given segment and usable for further reassembling the frame at the destination endpoint network node, and wherein the metadata structure is informative, at least, of sequence numbers of the frame and the given segment and a type of segment indicative of a relative location of the given segment within a sequence of segments from the plurality of segments;

for each given non-initial encapsulated segment, use the payload of the given segment to enable its transmission via the intermediate network node as an encapsulated pseudo-Ethernet frame, wherein enabling transmission of a given non-initial incapsulated segment as a pseudo-Ethernet frame comprises;

enabling reading, by the intermediate network node, data at +0 to +5 offset of the payload of the given segment as pseudo-DMAC (destination MAC) address by inserting therein an indication of a locally administered address, thereby assuring validity of the pseudo-DMAC address and enabling reading, by the intermediate network node, data at +6 to +11 offset of the payload as a pseudo-SMAC (source MAC) address by inserting therein an indication of unicast transmission, thereby assuring validity of pseudo-SMAC address, wherein the indications are inserted by replacing original payload bits at the locations designated to said indications;

inserting at +12 offset of the payload of the given segment VLAN tag of the VLAN tunnel, and storing the original payload bits in the added metadata structure, the stored original payload bits to be used for reassembling the given non-expedited Ethernet frame; and send each encapsulated segment from the plurality of encapsulated segments to the destination endpoint network node via the designated non-expedited tunnel.

12. The network node of claim 11, further configured to:
for each expedited Ethernet frame detect, among the second plurality of pre-provisioned tunnels, a tunnel with destination endpoint network node corresponding to a destination address specified in a given expedited Ethernet frame, thereby giving rise to a designated expedited tunnel;

encapsulate each expedited Ethernet frame in accordance with the designated expedited tunnel; and send each encapsulated expedited Ethernet frame to the destination endpoint network node via the designated expedited tunnel.

13. The network node of claim 11, further configured to associate the expedited frames with QOS marks indicative of a strict highest priority and transmit the expedited frames via the designated non-expedited tunnel shared with the segments of non-expedited frames.

14. The network node of claim 11, wherein the designated non-expedited tunnel is constituted by a plurality of successive sub-tunnels, the network node is further configured to provide initial encapsulation of each segment in accordance with a first of successive sub-tunnels and, when swapping to a next sub-tunnel in the plurality of successive sub-tunnels, to relay the encapsulation of each segment according to a network protocol characterizing the next sub-tunnel.

15. The network node of claim 14, wherein the transmission of the Ethernet frames between the source and the destination endpoint network nodes comprises transmitting over a 5G mobile network, and wherein the plurality of successive sub-tunnels comprises a plurality of sub-tunnels corresponding to a PDU-session usable for transmitting the encapsulated segments over the 5G network.

16. The network node of claim 15, wherein the transmission of Ethernet frames between the source and the destination endpoint network nodes further comprises transmitting the Ethernet traffic over a data network prior to transmitting it over the 5G mobile network interconnected with the data network with the help of an UPF (User Plane Function) network node, and wherein the designated non-expedited tunnel comprises a VLAN sub-tunnel between the source endpoint network node and the UPF network node, the VLAN sub-tunnel to be relayed at the UPF network node to the plurality of sub-tunnels corresponding to the PDU-session.

17. The system of claim 11, wherein the segments in the plurality of segments are of the same size, and wherein the size of the segments and the threshold size is defined in accordance with latency-bounding requirements of the time-sensitive transmission.

18. A non-transitory computer-readable medium comprising instructions that, when executed by a network node comprising a memory storing a plurality of program components executable by the network node, cause the network node to operate in an IET-blind communication network transmitting, via an intermediate network node, time-sensitive Ethernet traffic comprising expedited and non-expedited Ethernet frames, the operation comprising:
operating as a source node of a first plurality of pre-provisioned tunnels designated to non-expedited Ethernet traffic and of a second plurality of pre-provisioned tunnels designated to expedited Ethernet traffic, each tunnel specified, at least, by source and destination endpoint network nodes and by respective one or more network protocols, the operation comprising:
receiving expedited and non-expedited Ethernet frames;
for each non-expedited Ethernet frame that is larger than a predefined threshold size:
detecting, among the first plurality of pre-provisioned tunnels, a tunnel with a destination endpoint network node corresponding to a destination address specified in a given non-expedited Ethernet frame, thereby giving rise to a designated non-expedited tunnel, wherein the designated non-expedited tunnel comprises a VLAN tunnel starting at the source endpoint network node and passes through an intermediate network node;

providing segmentation of the given non-expedited Ethernet frame to yield a plurality of segments constituting the given frame;

encapsulating each segment from the plurality of segments in accordance with the designated non-expedited tunnel, thereby giving rise to a plurality of encapsulated segments comprising an initial segment and one or more non-initial segments, wherein each given encapsulated segment comprises a metadata structure added at the network node to a payload of the given segment and usable for further reassembling the frame at the destination endpoint network node, and wherein the metadata structure is informative, at least, of sequence numbers of the frame and the given segment and a type of segment indicative of a relative location of the given segment within a sequence of segments from the plurality of segments;

for each given non-initial encapsulated segment, using the payload of the given segment to enable its transmission via the intermediate network node as an encapsulated pseudo-Ethernet frame wherein the enabling transmission of a given non-initial encapsulated segment as a pseudo-Ethernet frame comprises:

enabling reading, by the intermediate network node, data +0 to +5 offset of the payload of the given segment as pseudo-DMAC (destination MAC) address by inserting therein an indication of a locally administrated address, the by assuring validity of the pseudo-DMAC address and enabling reading, by the intermediate network node, data at +6 to +11 offset of the payload as a pseudo-SMAC (source MAC address by inserting therein an indication of unicast transmission, thereby assuring validity of pseudo-SMAC address, wherein the indications are inserted by replacing original payload bits at the locations designated to said indications;

inserting at +12 offset of the payload of the given segment VLAN tag of the VLAN tunnel; and storing the original payload bits in the added metadata structure, the stored original payload bits to be used for reassembling the given non-expedited Ethernet frame; and sending each encapsulated segment from the plurality of encapsulated segments to the destination endpoint network node via the designated non-expedited tunnel.

\* \* \* \* \*